United States Patent [19]

Herndon

[11] Patent Number: 4,854,601
[45] Date of Patent: Aug. 8, 1989

[54] SWIVEL WHEEL WHEELBARROW

[76] Inventor: George W. Herndon, 806 N. Dawson St., Thomasville, Ga. 31792

[21] Appl. No.: 185,486

[22] Filed: Apr. 25, 1988

[51] Int. Cl.$^4$ .............................................. B62B 1/18
[52] U.S. Cl. ................................................. 280/47.31
[58] Field of Search ................. 280/47.11, 47.3, 47.31, 280/47.32

[56] References Cited

U.S. PATENT DOCUMENTS

| | | | |
|---|---|---|---|
| 546,091 | 9/1885 | Davis | 280/47.32 |
| 2,235,041 | 3/1941 | Ronning | 280/47.11 |
| 2,235,042 | 3/1941 | Ronning | 280/47.11 |
| 2,492,157 | 12/1949 | Riviere | 280/47.11 |
| 2,518,032 | 8/1950 | Lewis | 280/47.31 |
| 2,606,771 | 8/1952 | Rehnberg | 280/42 |
| 4,190,260 | 2/1980 | Pearce | 280/47.31 |

FOREIGN PATENT DOCUMENTS 253382 6/1925 United Kingdom ............. 280/47.32

OTHER PUBLICATIONS

The "Swivel-Wheel Wheelbarrow" George W. Herndon, 1958 Copyright Reg. No. A376952.
"Improved Swivel-Wheel Wheelbarrow", George W. Herndon, 1961, Two Photographs.

Primary Examiner—Charles A. Marmor
Assistant Examiner—Tamara L. Finlay
Attorney, Agent, or Firm—Weston, Hurd, Fallon, Paisley & Howley

[57] ABSTRACT

A swivel wheel wheelbarrow includes a pair of spaced beams that project forwardly from a tray. The wheel is supported by a fork from which a post extends. The lower end of the post is connected to the beams by means of a lower yoke support, and the upper end of the post is connected to the beams by means of an upper yoke support and braces. The lower and upper yoke supports are maintained in a stationary position in order to provide optimum support for the wheel.

16 Claims, 2 Drawing Sheets

SWIVEL WHEEL WHEELBARROW

BACKGROUND OF THE INVENTION

1. Field of the Invention

The invention relates to single-wheeled portable vehicles and, in particular, to such vehicles having a swivel-mounted wheel.

2. Description of the Prior Art

A conventional wheelbarrow has a bowl, or tray, supported atop a support structure that includes handles, legs, and a single wheel. In order to make it turn, the operator either must tilt the wheelbarrow in the direction of the turn or he must move the rear of the handles around and align the vehicle with the desired direction before proceeding in the new direction. When the wheelbarrow is loaded, particularly if the load is unstable, it can be extremely difficult to turn the wheelbarrow. Although various proposals have been made to provide a more maneuverable vehicle by employing some type of castering arrangement for the wheel, none of these efforts have been fully successful.

Early approaches to the problem are shown in U.S. Pat. No. 2,235,041 and U.S. Pat. No. 2,235,042, both issued on Mar. 18, 1941 to A. Ronning. The Ronning patents each disclose a manually propelled single wheel vehicle in which the wheel is swivel-mounted. Control cables are connected to the wheel and to hand grips included as part of the vehicle's handles. Rotation of the handles causes the wheel to be swiveled in one direction or the other, thereby changing the vehicle's path of travel. Unfortunately, the devices are exceedingly complex and, it is believed, difficult to operate.

Another approach is shown in U.S. Pat. No. 2,606,771, issued Aug. 12, 1952 to A.E. Rehnberg. Rehnberg discloses a collapsible combination wheelbarrow and automobile trailer. A single wheel is attached to a casting, which in turn is attached to collapsible tubing extending from a cargo-carrying container. The geometry of the various components is such that the wheel is poorly supported. The device functions primarily as an automobile trailer and only incidentally as a manually powered wheelbarrow.

Other approaches are known in which a castered wheel is connected to the tray by means of a pair of pipes or a triangular plate. Although these devices are less complex, and therefore more desirable, than prior devices such as those disclosed in the Ronning patents, they still fail to address certain problems. One of those problems relates to properly positioning the wheel relative to the tray such that the vehicle has desirable handling characteristics. Another problem not addressed is that of properly supporting the wheel so that it will withstand heavy loads.

Desirably, a swivel wheel wheelbarrow would be simple in construction and very strong, and yet would have good handling and maneuverability characteristics. Preferably the wheel construction would be such that it could be used with trays of various configurations. Also, it would be desirable if the wheelbarrow could be assembled from inexpensive, readily available components.

SUMMARY OF THE INVENTION

The present invention provides a new and improved swivel wheel wheelbarrow that addresses the foregoing concerns. The invention employs a support structure atop which a tray or bowl of any suitable configuration is disposed. The support structure includes spaced beams that extend forwardly of the tray. A wheel is connected to the ends of the beams by means of a wheel fork having a post, and upper and lower yoke supports. The lower yoke support is connected directly to the beams, while the upper yoke support is connected to the beams by means of braces. The lower and upper yoke supports thus are maintained in a stationary position.

In the preferred embodiment, a sleeve is fitted about the post. The sleeve includes laterally extending studs to which the braces are secured. The preferred embodiment also includes bearings that connect the post to the lower and upper yoke supports so that the swiveling action of the wheel is made easier. In an alternative embodiment, the sleeve is eliminated and the upper yoke support is in the form of a cap to which the braces are connected.

Because the wheel and its support structure are not connected to the tray, trays of various configurations can be used. Moreover, an optimum geometrical relationship among the various components of the support structure can be attained. Because the upper end of the post is rigidly connected to the beams, the wheel is supported in an exceedingly strong, yet simple manner. The invention thus provides a strong wheelbarrow that is relatively inexpensive and which has desirable handling and reliability characteristics.

The foregoing and other features and advantages of the invention will be apparent from reviewing the following description and claims, taken in conjunction with the accompanying drawings.

DESCRIPTION OF THE PREFERRED EMBODIMENT

Figure 1:
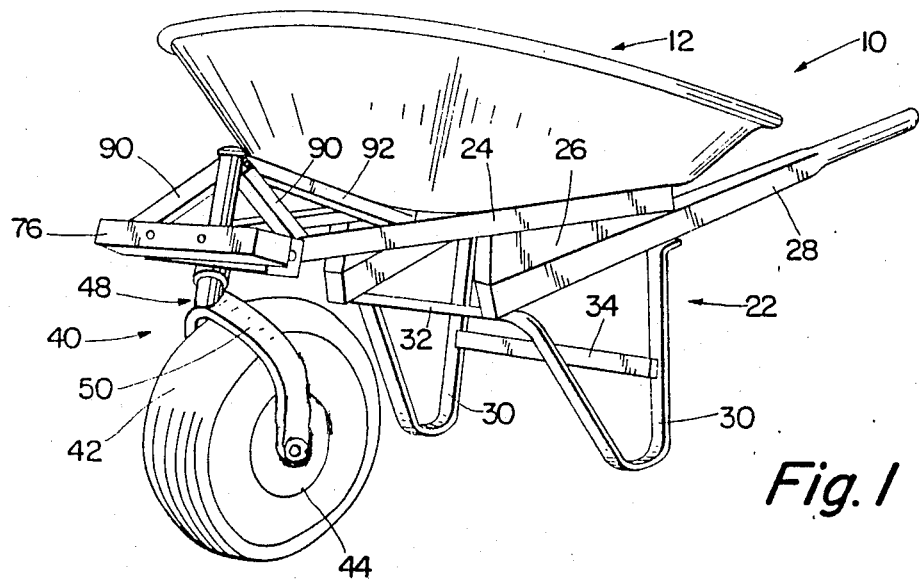
FIG. 1 is a perspective view of a swivel wheel wheelbarrow according to the invention.
Figure 2:
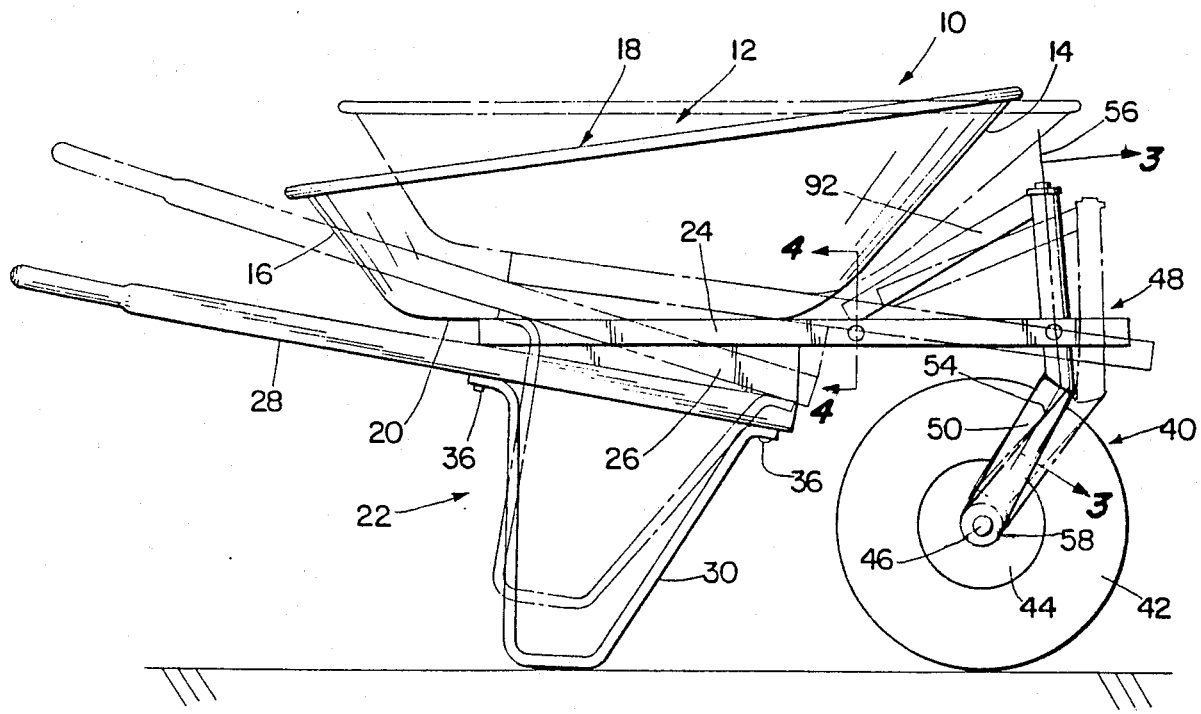
FIG. 2 is a side elevational view of the wheelbarrow of FIG. 1, in which the solid lines show the wheelbarrow in a resting position, and the phantom lines show the wheelbarrow in a raised position.

Referring to FIGS. 1 and 2, a swivel wheel wheelbarrow according to the invention is indicated generally by the reference numeral 10. The wheelbarrow 10 includes a tray 12. The tray 12 includes a front end 14, a rear end 16, an upper surface 18, and a lower surface 20. The tray 12 typically is made of metal, but it also can be fabricated from a plastics material. Also, the tray 12 can assume other configurations, if desired.

Figure 4:
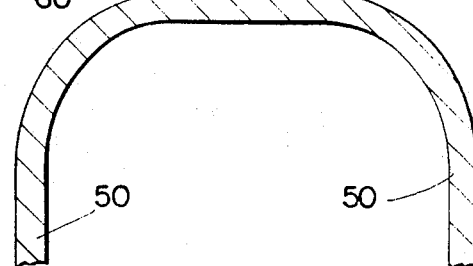
FIG. 4 is a view taken along a plane indicated by line 4—4 in FIG. 2, showing how a brace is connected to a beam.

The tray 12 is disposed atop, and secured to, a support structure 22. The support structure 22 includes a pair of spaced beams 24 that project from the front end 14. The beams 24 are spaced relatively far apart toward the rear end 16, and converge toward each other forwardly of the front end 14. The beams preferably are made of steel having a square cross-section (FIG. 4). A wedge, or riser 26, is disposed beneath each of the beams 24. A handle 28 is disposed beneath each of the risers 26 and extends rearwardly beyond the rear end 16. A first leg 30 is disposed beneath each of the handles 28. The legs 30 are connected by laterally extending braces 32, 34. Together, the legs 30 and the braces 32, 34 define a stand for supporting the wheelbarrow 10 in a resting position. The tray 12, beams 24, risers 26, handles 28, and legs 30 are rigidly connected to each other by means of various bolted fasteners such as those indicated in FIG. 2 by the reference numeral 36.

The wheelbarrow 10 also includes a wheel assembly 40 that is connected to the support structure 22. The wheel assembly 40 includes a pneumatic tire 42 fitted to a wheel 44 that is supported for rotation by an axle 46 and bearings (not shown). The wheel 44 is carried by a wheel fork 48. The fork 48 includes spaced, parallel second legs 50 and a post 52 (FIGS. 3 and 5) projecting from the legs 50. The legs 50 define a longitudinally extending axis indicated by the reference numeral 54 in FIG. 2. Similarly, the post 52 defines a longitudinal axis indicated by the reference numeral 56. Preferably the obtuse angle between the axes 54, 56 is approximately 145 degrees. The axle 46 extends through openings formed near the ends of the legs 50 and is secured in place by means of washers 58 and hitch pins (not shown). The wheel 44 rotates about an axis perpendicular to the axis 54.

Figure 3:
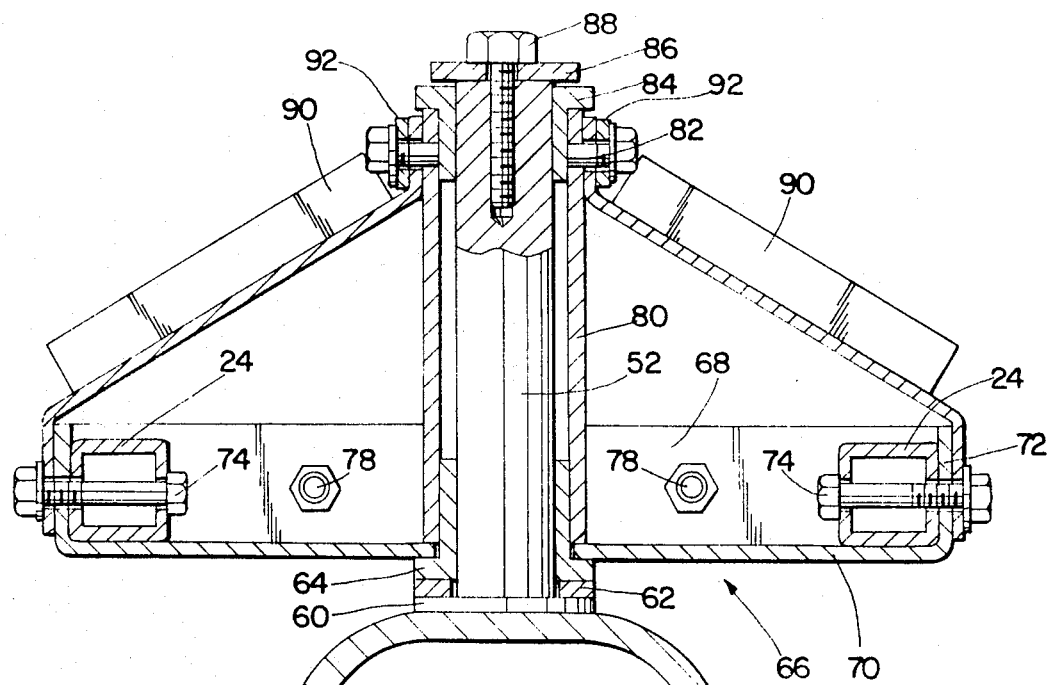
FIG. 3 is a view taken along a plane indicated by line 3—3 in FIG. 2, showing how the wheel is connected to the remainder of the wheelbarrow.

Referring now to FIG. 3, a bearing seat 60 is disposed about the post 52 near the intersection between the legs 50 and the post 52. For convenience, that end of the post 52 will be referred to as the lower portion of the post, while the end of the post 52 removed from the legs 50 will be referred to as the upper portion. A washer 62 is disposed about the post 52 and engages the upper surface of the bearing seat 60. A flanged bearing 64, preferably made of bronze, is fitted about the lower portion of the post 52 and engages the upper surface of the washer 62. A lower yoke support 66 in the form of an angle iron having a vertical portion 68 and a horizontal portion 70 is disposed about the lower portion of the post 52 and engages the upper surface of the flanged bearing 64. The horizontal portion includes upturned ends 72 to which the beams 24 are rigidly secured by means of bolted fasteners 74. Because the ends of the beams are constrained by the vertical wall 68, the horizontal wall 70, and the upturned ends 72, the connection between the beams 24 and the lower yoke support 66 is quite strong. A bumper 76 (FIG. 1) is secured to the front face of the vertical wall 68 by means of bolted fasteners 78.

A cylindrical sleeve 80 is disposed about the post 52 and includes laterally projecting studs 82 near its upper portion. A flanged bearing 84, preferably made of bronze, is fitted about the upper portion of the post 52. The flanged portion of the bearing 84 rests atop the end of the sleeve 80. A washer 86 is disposed atop the bearing 84, and a bolt 88 is threaded into an opening formed in the upper portion of the post 52. The length of the post 52 is such that a small gap exists between the bearing 84 and the washer 86.

Matched pairs of braces 90, 92 are connected at one end to the studs 82. The forwardmost braces 90 are connected at their other end to the beams 24 at the intersection between the beams 24 and the lower yoke support 66. The connection is made by means of the bolted fasteners 74. The other braces 92 are connected to the beams 24 at a location intermediate the lower yoke support 66 and the tray 12. The connection is made by means of bolted fasteners 94 (FIG. 4). The studs 82 and the braces 90, 92 define an upper yoke support that maintains the upper portion of the post 52 in a stationary position relative to the tray 12. Although the upper and lower portions of the post 52 are prevented from moving fore and aft relative to the tray 12, the bearings 64, 84 permit the post 52 to be pivoted about the longitudinal axis 56.

Figure 5:
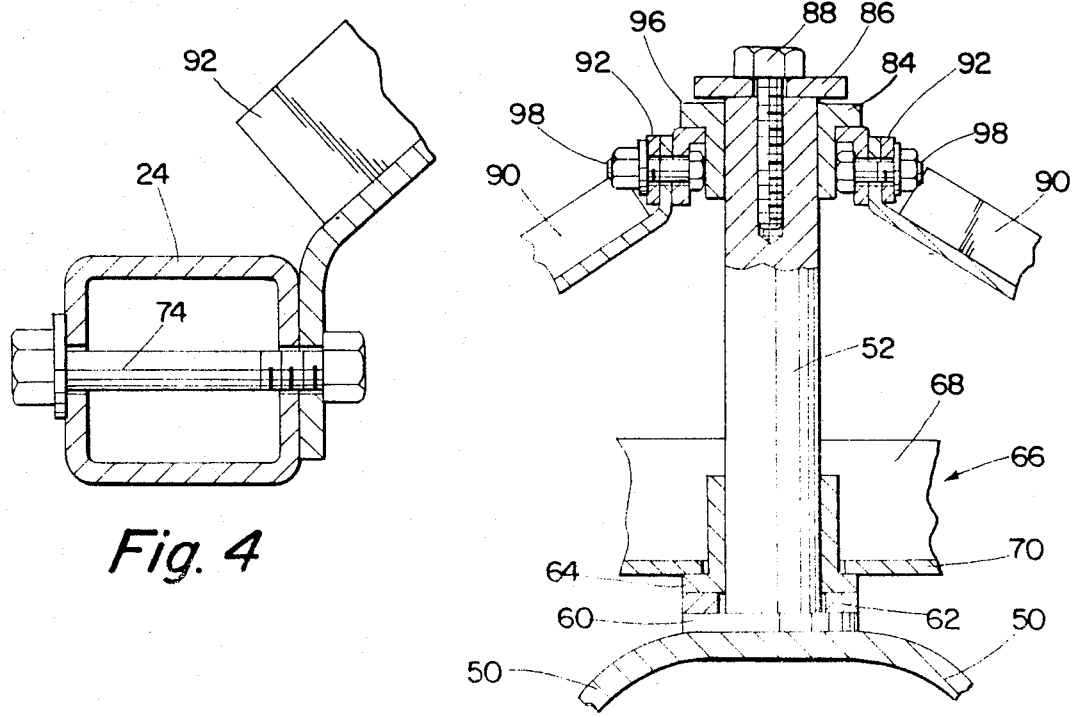
FIG. 5 is a view similar to FIG. 3, in which an alternative embodiment of the invention is illustrated.

An alternative embodiment of the invention is illustrated in FIG. 5. This embodiment of the invention is similar to the previously described embodiment, with the exception that the sleeve 80 has been eliminated and replaced by means of a cap 96 from which bolts 98 project laterally. The braces 90, 92 are connected to the bolts 98 in the same manner as they are connected to the studs 82. The alternative embodiment of the invention has the advantage of being slightly lighter and less expensive than the preferred embodiment, but it exposes the post 52 and the bearings 64, 84 to the atmosphere. The first-described embodiment of the invention thus is preferred because the sleeve 80 is strong and because it encloses the bearings 64, 84 and prevents them from being contaminated by dirt or moisture.

In operation, when the wheelbarrow 10 is lifted to the raised position as shown in FIG. 2, the post 52 is approximately vertical. In this position of the post 52, the legs 50 are inclined approximately 45 degrees to the rear from a vertical extension of the longitudinal axis 56. This angular relationship between the post 52 and the legs 50 has been found to produce good handling characteristics while retaining adequate strength. When it is desired to move the wheelbarrow 10 from place to place, the tire 42 quickly casters to that position shown in FIGS. 1 and 2. When it is desired to change the direction of travel of the wheelbarrow 10, it is necessary only that the operator apply sideways force to the handles 28. The wheelbarrow 10 will quickly change direction due to the swiveling nature of the wheel assembly 48.

As is apparent from the foregoing description, trays of various configurations can be attached to the support structure. Also, known components such as the handles, risers, and legs can be used with the support structure. Because the wheel-supporting post is rigidly connected to the beams both at its upper and lower ends, the wheel is supported in an exceedingly strong, yet simple manner. These advantages are attained by a relatively inexpensive construction that produces desirable handling and reliability characteristics.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. Support structure for a single-wheeled portable vehicle, comprising:
   spaced beams;
   a wheel fork having spaced legs defining a logitudinal axis and a post projecting from the legs, the post defining a longitudinal axis, the post including a lower portion adjacent the legs and an upper portion removed from the legs;

a lower yoke support rigidly connected to, and extending laterally between, the beams, the lower yoke support being connected to the lower portion of the post;

an upper yoke support in the form of a cap secured to the upper end of the post spaced from the lower yoke support and connected to the upper portion of the post; and braces connecting the upper yoke support to the beams.

2. The support structure of claim 1, wherein the braces include a first pair of braces connected to the beams at the intersection between the lower yoke support and the beams, and a second pair of braces connected to the beams at a location removed from the lower yoke support.

3. The support structure of claim 1, wherein the angle between the longitudinal axis of the legs and the longitudinal axis of the post is approximately 145 degrees.

4. The support structure of claim 1, further including bearings connecting the post to the lower yoke support and the upper yoke support.

5. A wheelbarrow, comprising:
a tray, the tray having a front end, a rear end, an upper surface, and a lower surface;
handles connected to the tray and projecting from the rear end of the tray;
first legs connected to the tray and projecting from the lower surface of the tray;
spaced beams connected to the lower surface of the tray and projecting from the front end of the tray;
a wheel fork having spaced second legs defining a longitudinal axis and a post projecting from the second legs, the post defining a longitudinal axis, the post having a lower portion adjacent the second legs and an upper portion removed form the second legs;
a wheel connected to, and mounted between, the second legs for rotational movement about an axis perpendicular to the longitudinal axis of the second legs;
a lower yoke support rigidly connected to, and extending laterally between, the beams, the lower yoke support being connected to the lower portion of the post;
an upper yoke support in the form of a cap secured to the upper end of the post spaced from the lower yoke support and connected to the upper portion of the post;
the lower yoke support and the upper yoke support permitting the post to pivot about the longitudinal axis of the post; and
means connected between the upper yoke support and the beams for maintaining the upper yoke support in a stationary position relative to the tray.

6. The wheelbarrow of claim 5, wherein the means for maintaining the upper yoke support in a stationary position is in the form of braces connected between the upper yoke support and the beams.

7. The wheelbarrow of claim 6, wherein the braces include a first pair of braces connected to the beams at the intersection between the lower yoke support and the beams, and a second pair of braces connected to the beams at a location intermediate the lower yoke support and the tray.

8. The wheelbarrow of claim 5, wherein the beams have a square cross-section.

9. The wheelbarrow of claim 5, wherein the angle between the longitudinal axis of the second legs and the longitudinal axis of the post is approximately 145 degrees.

10. The wheelbarrow of claim 5, wherein the position of the post relative to the tray is such that the longitudinal axis of the post is approximately vertical when the wheelbarrow is in a raised position.

11. The wheelbarrow of claim 5, further including bearings connecting the post to the lower yoke support and the upper yoke support.

12. The wheelbarrow of claim 5, further including a bumper connected to the lower yoke support at the forward end of the lower yoke support.

13. A wheelbarrow, comprising:
a tray, the tray having a front end, a rear end, an upper surface, and a lower surface;
handles connected to the tray and projecting from the rear end of the tray;
first legs connected to the tray and projecting from the lower surface of the tray;
spaced beams connected to the lower surface of the tray and projecting from the front end of the tray;
a wheel fork having spaced second legs defining a longitudinal axis and a post projecting from the second legs, the post defining a longitudinal axis, the post having a lower portion adjacent the second legs and an upper portion removed from the second legs;
a wheel connected to, and mounted between, the second legs for rotational movement about an axis perpendicular to the longitudinal axis of the second legs;
a lower yoke support rigidly connected to, and extending laterally between, the beams, the lower yoke support being connected to the lower portion of the post;
a sleeve disposed about the post, the sleeve including laterally extending studs projecting from adjacent the upper end of the post; and
braces rigidly connecting the studs to the beams the braces including a first pair of braces connected to the beams at the intersection between the beams and the lower yoke support, and a second pair of braces connected to the beams at a location intermediate the lower yoke support and the tray.

14. The wheelbarrow of claim 13, further including a first bearing connecting the lower portion of the post to the lower yoke support, and a second bearing connecting the upper portion of the post to the upper portion of the sleeve.

15. Support structure for a single-wheeled portable vehicle, comprising:
spaced beams;
a wheel fork having spaced legs defining a longitudinal axis and a post projecting from the legs, the post defining a longitudinal axis, the post including a lower portion adjacent the legs and an upper portion removed from the legs;
a lower yoke support rigidly connected to, and extending laterally between, the beams, the lower yoke support being connected to the lower portion of the post;
an upper yoke support spaced from the lower yoke support and connected to the upper portion of the post; and
braces connecting the upper yoke support to the beams, the braces including a first pair of braces connected to the beams at the intersection between the lower yoke support and the beams, and a second pair of braces connected to the beams at a location removed from the lower yoke support.

16. A wheelbarrow, comprising:
a tray, the tray having a front end, a rear end, an upper surface, and a lower surface;
handles connected to the tray and projecting from the rear end of the tray;
first legs connected to the tray and projecting from the lower surface of the tray;
spaced beams connected to the lower surface of the tray and projecting from the front end of the tray;
a wheel fork having spaced second legs defining a longitudinal axis and a post projecting from the second legs, the post defining a longitudinal axis, the post having a lower portion adjacent the second legs and an upper portion removed from the second legs;
a wheel connected to, and mounted between, the second legs for rotational movement about an axis perpendicular to the longitudinal axis of the second legs;

a lower yoke support rigidly connected to, and extending laterally between, the beams, the lower yoke support being connected to the lower portion of the post;
an upper yoke support spaced from the lower yoke support and connected to the upper portion of the post;
the lower yoke support and the upper yoke support permitting the post to pivot about the longitudinal axis of the post; and
means connected between the upper yoke support and the beams for maintaining the upper yoke support in a stationary position relative to the tray, the means for maintaining the upper yoke support in a stationary position being in the form of braces connected between the upper yoke support and the beams, the braces including a first pair of braces connected to the beams at the intersection between the lower yoke support and the beams, and a second pair of braces connected to the beams at a location intermediate the lower york support and the tray.

* * * * *